UNITED STATES PATENT OFFICE.

GUSTAVE A. DANET AND XAVIER E. C. FEUILLANT, OF PARIS, FRANCE.

IMPROVEMENT IN METHODS OF PRESERVING ANIMAL AND VEGETABLE SUBSTANCES.

Specification forming part of Letters Patent No. 155,572, dated October 6, 1874; application filed May 1, 1874.

*To all whom it may concern:*

Be it known that we, GUSTAVE ADOLPHE DANET and XAVIER ETIENNE CHARLES FEUILLANT, both of Paris, in the Republic of France, gentlemen, have invented certain Improvements in the Method of Preserving Animal and Vegetable Substances, of which the following is a specification:

This invention consists in the employment of a slight desiccation, combined with treating the material in water-tight recipients containing an atmosphere of sulphurous acid and purified air.

The process is as follows: Directly the vegetable or animal substances are collected or the animals slaughtered, they are placed in a dry chamber, kept at a temperature of 32° Fahrenheit, and in which dry air is caused to circulate. When the substances are thus dried (this drying operation is regulated at will) we inclose the products in water-tight recipients. These recipients should be such as will intercept the action of the external air and moisture. To better enable them to prevent the action of the moisture, we introduce into each recipient a bag containing a suitable hygrometric body, of such a nature as shall not affect the substances to be preserved. Each of the recipients is provided with two cocks, placed in a suitable manner to allow the whole or part of the interior atmosphere to be changed. When the preserved substances and the drying-bag are introduced, the recipient is put in communication with any appropriate apparatus, so arranged that a stream of sulphurous acid, and also a stream of air heated to red heat, shall, at will, take the place of the interior atmosphere, so that this atmosphere shall be finally formed of purified air mixed with sulphurous acid. This result being obtained, the recipient is closed by closing the cocks, and the recipients are placed in localities which may be kept, or not, at a temperature of 32°.

We produce the sulphurous acid by any of the usual known means; and the air, purified by fire, which we employ, is best obtained by the passage of such air through a double worm, one of the worms being kept in an incandescent state by means of a stove; the other is plunged in a current of cold water. The air egressing from this apparatus is then at a suitable temperature after being successively heated and cooled.

Other suitable mechanical arrangements may be employed, but we do not herein claim the apparatus.

What we claim is—

The improved method of preserving animal and vegetable substances or matters by the employment of slight desiccation, combined with treatment in water-tight recipients filled with an atmosphere of sulphurous acid and air purified by fire, as hereinbefore described.

G. A. DANET.

X. E. C. FEUILLANT.

Witnesses:
   H. DEERING,
   H. S. DUPONT.